United States Patent
Anghel et al.

(10) Patent No.: US 11,347,970 B2
(45) Date of Patent: May 31, 2022

(54) OPTIMIZING MACHINE LEARNING-BASED, EDGE COMPUTING NETWORKS

(71) Applicant: International Business Machines Corporation, Armonk, NY (US)

(72) Inventors: Andreea Anghel, Adliswil (CH); Georgios Kathareios, Zurich (CH); Mitch Gusat, Langnau a.A. (CH)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 15/966,702

(22) Filed: Apr. 30, 2018

(65) Prior Publication Data

US 2019/0332895 A1    Oct. 31, 2019

(51) Int. Cl.
*G06K 9/62* (2022.01)
*H04L 41/14* (2022.01)
(Continued)

(52) U.S. Cl.
CPC ........... *G06K 9/6257* (2013.01); *G06N 20/00* (2019.01); *H04L 41/14* (2013.01); *H04L 43/0876* (2013.01)

(58) Field of Classification Search
CPC .... G06K 9/6257; G06N 20/00; G06N 3/0454; G06N 5/003; G06N 20/20; G06N 3/088;
(Continued)

(56) References Cited

U.S. PATENT DOCUMENTS 9,503,466 B2    11/2016    Vasseur et al.
9,547,828 B2    1/2017    Mermoud et al.
(Continued)

FOREIGN PATENT DOCUMENTS

WO    2016/118815 A1    7/2016

OTHER PUBLICATIONS

Jaokar, A., "Continuous improvement for IOT through AI / Continuous Learning", http://www.kdnuggets.com/2016/11/continuous-improvement-iot-ai-learning.html, Nov. 2016, 6 pages.
(Continued)

*Primary Examiner* — Nicholas R Taylor
*Assistant Examiner* — Sanjoy K Roy
(74) *Attorney, Agent, or Firm* — Scully, Scott, Murphy & Presser, P.C.; Daniel P. Morris

(57) ABSTRACT

Optimizing a network comprising a core computing system (CCS) and a set of edge computing devices (ECDs), wherein each of the ECDs locally performs computations based on a trained machine learning (ML) model. A plurality of ML models are continually trained at the CCS, concurrently, based on data collected from the ECDs. One or more states of the network and/or components thereof are monitored. The monitored states are relied upon to decide (when) to change a trained ML model as currently used by any of the ECDs to perform said computations. It may be decided to change the model used by a given one of the ECDs to perform ML-based computations. One of the models as trained at the CCS is selected (based on the monitored states) and corresponding parameters are sent to this ECD. The latter can resume computations according to a trained model.

16 Claims, 4 Drawing Sheets

(51) Int. Cl.
  *H04L 43/0876* (2022.01)
  *G06N 20/00* (2019.01)
(58) Field of Classification Search
  CPC ... H04L 41/14; H04L 43/0876; H04L 41/145; Y02D 10/00; G06F 2209/504; G06F 9/505
  See application file for complete search history.

(56) References Cited

U.S. PATENT DOCUMENTS

| | | | |
|---|---|---|---|
| 9,722,815 | B2 | 8/2017 | Mukundan et al. |
| 2016/0217387 | A1* | 7/2016 | Okanohara ............ G06N 20/00 |
| 2017/0060574 | A1 | 3/2017 | Malladi et al. |
| 2017/0279828 | A1* | 9/2017 | Savalle ................ H04L 41/142 |
| 2018/0032915 | A1* | 2/2018 | Nagaraju .............. G06K 9/6262 |
| 2019/0036716 | A1* | 1/2019 | Kasaragod ............ H04L 63/104 |
| 2019/0370686 | A1* | 12/2019 | Pezzillo ................ G06N 20/00 |

OTHER PUBLICATIONS

Cognitive Edge Computing, "Cognitive Edge Computing", http://cogedge.ece.utexas.edu, Oct. 15, 2017, 3 pages.

Microsoft, "Machine Learning on the Edge", https://www.microsoft.com/en-us/research/project/machine-learning-edge/, Accessed on Apr. 17, 2018, 6 pages.

Meng, W., "Two-Bit Networks for Deep Learning on Resource-Constrained Embedded Devices", Jan. 4, 2017, Downloaded from https://arxiv.org/abs/1701.00485 on Apr. 17, 2018, 2 pages.

Lecun, Y., et al., The MNIST Database of handwritten digits, http://yann.lecun.com/exdb/mnist/, Accessed on Apr. 17, 2018, 8 pages.

Reale, P., "A guide to Edge IoT analytics", IBM, https://www.ibm.com/blogs/internet-of-things/edge-iot-analytics/, Feb. 23, 2017, Accessed on Apr. 18, 2018, 13 pages.

Kumar, A., et al., "Resource-efficient Machine Learning in 2 KB RAM for the Internet of Things", Proceedings of the 34th International Conference on Machine Learning, PMLR 70, 2017, https://www.microsoft.com/en-US/research/wp-ontent/uploads/2017/06/kumar17.pdf, Accessed on Mar. 10, 2022, 10 pages.

Perera, C., et al., MOSDEN: An Internet of Things Middleware for Resource Constrained Mobile Devices, 2014 47th Hawaii International Conference on System Sciences (HICSS), Jan. 6-9, 2014, http://ieeexplore.IEEE.org/document/6758734/, Accessed on Mar. 10, 2022, pp. 1053-1062.

King, J., et al., "A Distributed Security Mechanism for Resource-Constrained IoT Devices", Informatica (2016), Received Oct. 30, 2015, pp. 133-143, 40.

Alsheikh, M.A., et al., "Machine Learning in Wireless Sensor Networks: Algorithms, Strategies, and Applications", arXiv:1405.4463v2, Mar. 19, 2015, 23 pages.

* cited by examiner

OPTIMIZING MACHINE LEARNING-BASED, EDGE COMPUTING NETWORKS

BACKGROUND

The present application relates in general to networks having an edge computing architecture, and in particular relates to method and systems optimizing machine learning-based computations as performed at edge computing devices of the network.

Edge computing is a method that is notably used to optimize resources in cloud computing networks. With such an architecture, some data processing is performed at the edge of the network, i.e., close to where the data is, so as to reduce the network bandwidth consumption between edge devices and the core system. This way, analytics and data generation can be performed closer to the data source. Edge architectures may involve various technologies, such as wireless sensor networks, mobile data acquisition and signature analysis, mobile edge computing, peer-to-peer networking, local cloud/fog computing, grid/mesh computing, cloudlet, etc. Various cloud services may accordingly be designed, such as distributed data storage and retrieval, remote cloud services, etc.

Like known edge computing architectures, the Internet of Things (IoT) relies on the deployment of a large number of small, cheap, power/resource-constrained computing nodes (called edge devices). Edge devices generate streams of data that are processed locally and at the core of the system. A variety of edge device types can be used (e.g., from mobile phones to industrial supervisory control and data acquisition systems), each with its own constraints. The edge workloads too may vary considerably.

SUMMARY

According to a first aspect, the present invention is embodied as a method for optimizing a network, such as a cloud computing network. The network has an edge computing architecture. I.e., it comprises a core computing system, or CCS, and a set of edge computing devices, or ECDs, wherein each of the ECDs locally performs computations based on a trained machine learning (ML) model and is in data communication with the CCS. According to the method, a plurality of ML models are continually trained at the CCS, concurrently, based on data collected from the ECDs (e.g., application data). While the models are being trained at the CCS, one or more states of the network and/or components thereof are monitored. The monitored states are relied upon to decide (whether and when) to change a trained ML model as currently used by any of the ECDs to perform said computations.

Assume for instance that it is decided (based on the monitored states of the network) to change the ML model hitherto used by a given one of the ECDs to perform ML-based computations. Then, one of the models as trained at the CCS is selected (again based on the monitored states) and corresponding parameters are sent to this ECD. The latter can thus resume computations according to a trained model that is based on the parameters sent to the ECD.

The present approach allows limited resources of the edge computing devices to be taken into account. The concurrent training of a plurality of ML models at the core nevertheless allows accurate ML models to be achieved, based on data collected from the edge devices, thanks to the comparatively large computational resources available at the core. This way, an efficient edge computing system can be achieved, which, can possibly explore a variety of ML models and accurately train such models to make them available to the edge devices, at no additional costs for the edge devices.

In embodiments, the above method may comprise one or more of the following features:

Monitoring said states comprises monitoring states of the ECDs and/or a network state of the network;

Monitoring said states comprises monitoring states of the ECDs, and said one of the trained models is selected based on one or more monitored states of said given one of the ECDs;

Deciding to change the trained ML model is performed locally at said given one of the ECDs;

The CCS comprises a core computation device, or CCD, and a gateway, the latter in data communication with, on the one hand, the CCD and, on the other hand, at least a subset of the ECDs, said subset including said given one of the ECDs;

The method further comprises, after deciding to change the trained model: receiving, at the gateway, a request to change of trained ML model from said given one of the ECDs; and, after having selected said one of the models trained at the CCS, sending, from the gateway, said corresponding parameters to said given one of the ECDs;

The method further comprises, upon receiving the request and prior to sending said corresponding parameters from the gateway: transferring to the CCD a request corresponding to the request as received at the gateway, for the CCD to select said one of the models and send corresponding parameters to the gateway;

Monitoring said states comprises monitoring figures of merit for respective models as currently used at the ECDs. Thus, the decision to change the trained machine learning model hitherto used by said given one of the ECDs may be based on a figure of merit as monitored for the model hitherto used by said given one of the ECDs. Preferably, said one of the trained models is further selected based on this figure of merit;

Monitoring said states comprises monitoring states as to one or more of: a workload; a power budget; and a computational budget of one or each of the ECDs;

The CCS comprises a core computation device, or CCD, and a gateway, the latter in data communication with, on the one hand, the CCD and, on the other hand, at least a subset of the ECDs, said subset including said given one of the ECDs and the steps of monitoring said states, deciding to change the trained model and selecting said one of the models are each performed at said one of the CCD and the gateway;

The method further comprises: storing parameters of the trained models, upon completion of the training of each of the trained models, on said one of the CCD and the gateway, and the parameters of the selected model are sent to said given one of the ECDs from said one of the CCD and the gateway;

The steps of monitoring, deciding to change the trained model, selecting said one of the models and sending corresponding parameters are each performed at the gateway;

Each of said ECDs is configured to potentially run several types of trained ML models, one at a time, as an inference engine; and Selecting comprises selecting both a type of model and parameters thereof (based on the monitored states), and the method further comprises sending data pertaining to the selected type of model, in addition to sending parameters thereof, to said given one of the ECDs, for the latter to resume computations according to a trained machine learning model based on the data and parameters sent.

Embodiments of the present invention involve one or more gateways, for reasons that will become apparent later. Such gateways, however, are optional. For instance, decisions to change the trained ML model can be made at the ECDs or at a CCD.

According to another aspect, the invention is embodied as a method for optimizing a network such as described earlier, whose steps as implemented at the CCS comprise continually training a plurality of ML models, based on data collected from the ECDs. Meanwhile, and upon deciding to change a trained ML model as hitherto used by a given one of the ECDs, the CCS selects one of the models trained thereat (again based on the monitored states) and sends corresponding parameters to said given one of the ECDs. The latter can thus resume computations according to a trained machine learning that is based on the parameters sent.

According to a further aspect, the invention is embodied as a method for optimizing a network (such as described earlier), whose steps as implemented at each ECD are as follows. One or more states of said each ECD are monitored. At some point in time, the ECD shall receive parameters corresponding to a selected one of the trained models that are being continually trained at the CCS, which model is selected based on the monitored states, such that the ECD may resume computations based on the parameters received.

Preferably, this method further comprises, at said each ECD, continually performing said computations thanks to a currently active model, in response to requests from applications in data communication with said each ECD. The currently active model is configured as an inference engine to perform said computations.

According to still another aspect, the invention is embodied as a network having an edge computing architecture, such as evoked above. I.e., the network comprises a CCS and a set of ECDs, wherein each of the ECDs is configured to locally perform computations based on a trained ML model and is in data communication with the CCS. The CCS is configured to continually train a plurality of ML models, based on data it collects from the ECDs, in operation. In addition, the network is configured to monitor states of the network and/or components thereof and decide, based on the monitored states, whether to change the trained ML model hitherto used by a given one of the ECDs to perform said computations. The network is further configured to select, based on the monitored states, one of the models trained at the CCS and send corresponding parameters to said given one of the ECDs, for the latter to resume computations according to a trained machine learning model based on the parameters sent, in operation.

According to a final aspect, the invention is embodied as a computer program product. The latter comprises a computer readable storage medium having program instructions embodied therewith, the program instructions executable by one or more processors of the network, to cause the network to implement steps of a method as in any of the embodiments evoked above.

Computerized systems, methods, and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Similar or functionally similar elements in the figures have been allocated the same numeral references, unless otherwise indicated.

DETAILED DESCRIPTION OF EMBODIMENTS OF THE INVENTION

The following description is structured as follows. First, general embodiments and high-level variants are described (sect. 1). The next section addresses more specific embodiments and technical implementation details (sect. 2).

1. General Embodiments and High-Level Variants

Figure 1:
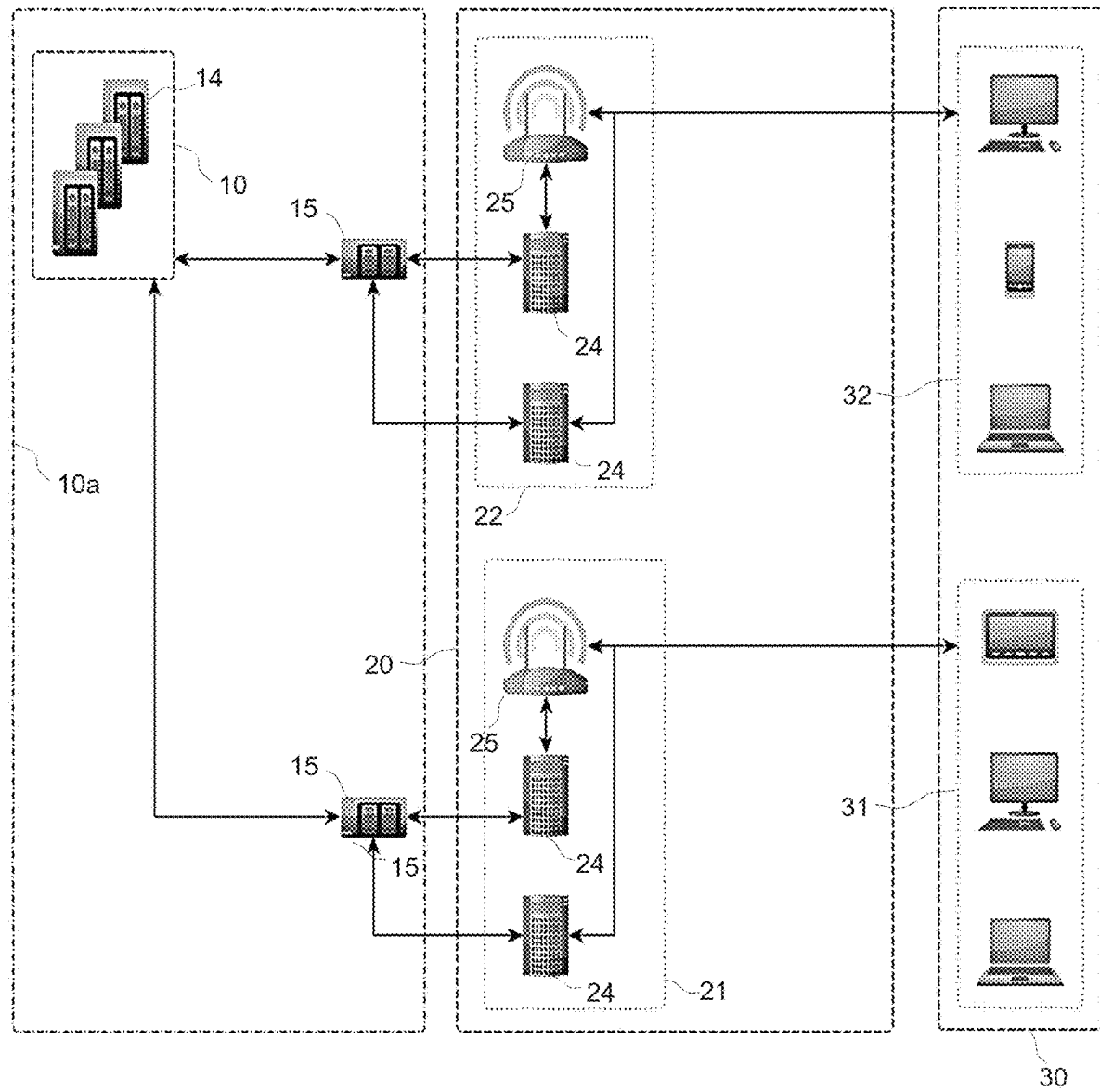
FIG. 1 schematically represents a network having an edge computing architecture, wherein a set of edge computing devices are in data communication with a core computing system, as in embodiments of the invention.

In reference to FIGS. 1-4, an aspect of the invention is first described, which concerns methods for optimizing a network 1, such as depicted in FIG. 1. This network 1 may for example be a cloud computing network. It is in all cases assumed to have an edge computing architecture. That is, the network 1 comprises a core computing system 10, 10a (hereafter abbreviated to "CCS") and a set of edge computing devices 24 ("ECDs"). Each of the ECDs 24 is in data communication with the CCS 10, 10a. The data communication may be indirect, e.g., a gateway may be involved and the network segments 10, 20 may rely on distinct network protocols. Each ECD 24 is assumed to be designed to locally perform computations, using a trained machine learning ("ML") model 29.

The edge computing architecture relied on makes it possible to optimize resources in the overall network 1, thanks to data processing performed at the edge of the network 1, i.e., close to entities requesting or causing such computations. This allows the network bandwidth consumption to be reduced.

Edge devices as involved herein are typically end-nodes of the network, which may be, e.g., low-power electrical and computational computing nodes. An edge device as meant herein may also serve as entry point into the core network 1 and be implemented as, e.g., a router, a routing switch, an integrated access device or other access device, or a multiplexer. Such devices are sometimes described as devices located in the "fog". ECDs 24 may for instance be deployed on site, with one or more sensors 30 attached for performing any kind of measurements, e.g., as to properties of the environment of the edge devices and/or sensors attached thereto. Such sensors could for instance be used for monitoring the temperature or some pollution level.

The core computing system 10, 10a may notably include one or more core computing devices 14 (e.g., high-performance computing devices, datacenters, clusters, etc.). In the example of FIG. 1, the core system 10 essentially includes core computing devices 14 (hereafter abbreviated to CCD). In a broader sense, a core computing system 10a may further include gateways 15, where each gateway 15 is adapted to communicate with both the core computing devices 14 and at least a subset 21, 22 of the ECDs 24, as assumed in FIG. 1. The gateways 15 may in fact be mere bridges, depending on the network segments 10 (10a), 20 involved, the protocol(s) they use, etc.

Basically the present methods aim at concurrently training a multitude of ML models at the core, which models can then be timely made available for use at any of the edge devices. Namely, a plurality of ML models 19, 19a, 19b are concurrently trained (step S20 in FIG. 2 or 3) at the CCS 10, 10a, based on data collected S10, S15 from the ECDs 24. I.e., this way, a plurality of trained models is constantly available for each of the ECDs 24.

In the meantime, states of the network 1 (and/or states of components 14, 15, 24, 25 of this network 1) are being monitored S30, S35. It is further decided S40, S45, based on the monitored states, whether to change the trained ML model 29 hitherto used by any of the ECDs 24 to perform S90 said computations.

The ML models trained at the CCS are preferably trained based on application data (e.g., images, metadata extracted from images, environment-related sensorial data such pollution levels, etc.), as collected from the ECDs. The data collection S10 is performed concurrently with the monitoring S30, S35, whereby metrics such as, e.g., power consumption, model accuracy, etc. are monitored, as discussed later. The data collection S10, training S20, and monitoring S30, S35 involve distinct concepts. The states of the system are typically used in a program (e.g., a state machine) that is distinct from the training algorithm used at the CCS and the data collection mechanism. This program (e.g., state machine) may be run at any level, i.e., ECD, gateway, CCD, so as to trigger S40, S45 a model change, whereas the training need be performed at the core 14. The data collection S10, on the other hand, primarily involve the ECDs, though it could be relayed on upper levels (gateway, CCD).

The decision S40, S45 to locally change the ML models is preferably made in a similar manner for each of the ECDs 24, i.e., this decision depends on the states monitored at step S30, S35 and possibly on additional factors, such as figures of merit obtained in respect of ML models as locally used at the ECDs, as discussed later. That is, a same decision mechanism is preferably involved, whereby a decision can be made to change of ML model, when necessary.

For example, assuming that it is, at some point in time, decided to change the trained ML model 29 hitherto used by a given ECD 24, then one of the models 19, 19a, 19b trained S20 at the CCS 10, 10a is selected S60, S65, based on the monitored states, and parameters corresponding to the selected model are subsequently sent S70, S75 to said given ECD 24. This way, the latter may implement a new ML model (i.e., corresponding to the parameters received) and resume S90 computations accordingly.

Note that the ECDs 24 are typically resource-constrained devices. Because of their limited resources, the ECDs may notably not be able to locally train ML models (and a fortiori not a plurality of ML models). Such devices 24 may nonetheless periodically (or continually) send S15 compressed data they collect S10 to the core devices 14, e.g., via a gateway 15 (as assumed in FIGS. 2 and 3) or directly to the CCD 14, or, still, send such data on demand, for example. This way, the CCD 14 can concurrently train S20 several ML models 19, 19a, 19b based on data collected S10, S15 from the ECDs 24.

Now, even though ECDs 24 may not be suited for locally training ML models, they are nevertheless able to use (e.g., execute) a trained model, for performing S90 computations, e.g., as required or caused by client devices 30 of the ECDs 24 or applications running on such devices 30, wherein the devices 30 may be sensors or other computerized devices. The ECDs 24 may for instance be able to run several types of ML models, albeit in batch (i.e., one at a time), due to typical resource constraints at the ECDs 24.

On the contrary, various ML models can be concurrently trained at the CCS 10, 10a, which enjoys much larger computational resources than the ECDs 24. The continual training S20 may involve a single type of ML model, which is continually retrained based on data collected from the edge. Several sets of parameters may accordingly be obtained over time, for each of the ECDs 24 (or for subsets thereof). This makes it possible to search and find the set of parameters that minimize some objective function (e.g., an error function), based on observations S30, S35 by the ECDs 24 or by any monitoring entity 14, 15.

In variants, the concurrent training S20 of the ML models at the CCS 10, 10a may possibly allow different types of models to be trained and sets of parameters to be optimized for such types of models. Again, several sets of parameters may be obtained (for the several types of models) over time and, this, for each of the ECDs 24. Eventually, this makes it possible to find the model type and the set of parameters that minimize some objective function (e.g., an error function), which minimization may again involve data collected from the ECDs 24. In this case, not only the model parameters are updated (based on the continuous learning of a model) but also the type of model used, e.g., based on real-time constraints of the infrastructure edge devices. The search problem is thus not necessarily limited to the parameter space; it may further extend to the model type.

Note that, in the literature, the terms "cognitive algorithm", "cognitive model", "machine learning model" or the like are often interchangeably used. This description makes no exception. However, in an effort to clarify terminologies, one may tentatively adopt the following definition: a machine learning model is generated by a cognitive algorithm, which learns its parameter(s) from input data points, so as to arrive at a trained model. Thus, a distinction can be made between the cognitive algorithm used to train a model (i.e., the model being trained) and the model that eventually results (here called trained, or even retrained model) upon completion of the training.

Whether a single type of models or several types of models (relying on distinct cognitive algorithms) are used, the training (or retraining) of the model(s) continually leads to new sets of parameters, which eventually yield different trained models. The parameters as obtained upon completing a training phase can be stored on the CCDs 14 or on gateways 15, so as to be later available for distribution to the ECDs 24. In all cases, several trained models (be they of different types, or not) are constantly available for each ECD, at any time. That is, even in embodiments where only a single type of ML model is available for a given ECD (e.g., as implemented by way of neural networks, decision trees, linear regression), several sets of optimized parameters are nonetheless constantly available, such that several trained models are constantly available for selection. Thus, a selection of an appropriate model must be performed S60, S65 in all cases.

Even though the training is primarily based on data collected from the ECDs, this does not prevent the CCS to additionally take into account data provided from sources that are distinct from the ECDs, such as human experts (e.g., new images may be provided by human experts). In addition, the data as collected by ECDs may themselves be subject to some expert validation, such that an intermediate expert validation stage may possibly be involved (not shown).

The trained models are typically used as inference engines at the ECDs 24, e.g., for classification purposes. For example, the trained models may be used for image recognition purposes (e.g., classify an image as a "red car" or a "blue car"). As another example, such trained models may be used for regression problems, e.g., to predict some pollution level, as evoked earlier. The trained models could further be used for detecting anomalies in the network 1 (e.g., based on signatures or behaviors of the data traffic), amongst other examples. In each of these examples, the edge devices will only run the trained models for inference purposes, whereas the training of the models is carried out at a core device.

For example, the ECDs 24 may be able to run several types of inference models (i.e., initially based on several types of cognitive algorithms) and may thus possibly switch between types of models based on the status of the edge resources. To that aim, the CCS 10, 10a may train a large set of learning models to derive inference models with different resource requirements, where the various inference models may subsequently be deployed on the (e.g., hybrid) ECDs, while ECDs monitor the status of their resources to decide whether a model change is required to optimize their operations, as assumed in FIG. 2.

The present approach allows the limited resources of the ECDs to be taken into account. The concurrent training of the ML models at the core makes it nevertheless possible to obtain accurate ML models (based on data collected from the edge and optionally from other sources) thanks to the comparatively larger computational resources available at the core. For instance, where a simple linear classifier (as typically implemented at an ECD) achieves ~10% error with minimal computation requirements, a large deep convolutional neural network achieves 0.2-0.3%. This way, substantial improvement can be achieved in the accuracy (error) of the ML models, without requiring additional resources from the edge. On the contrary, edge resources can be freed, since ECDs need not to invest in learning. In addition, and as noted above, instead of a single model per edge device, the core shall preferably train a multitude of ML models of different types. This makes it subsequently possible to select the most suitable type of model (in addition to the best or latest updated parameters) for it to be run at any moment in time, on each edge device 24, e.g., based on desired requirements/performance trade-off. This way, an efficient edge computing system is achieved, which can explore a large variety of ML models, e.g., each with its own computation/power requirements and performance speed or accuracy, notwithstanding the limited resources of the edge constraints. The above scheme can advantageously be applied for hierarchical learning in resource-constrained environments such as the Internet of things (IoT).

In general, the monitoring S30, S35 involved may aim at monitoring states of the ECDs 24 and/or a network state of the network 1. A "state" or "states" as monitored herein refer to the particular condition of each ECD and/or the network (as a whole), which may likely evolve over time. That is, the present method may keep track of local states (e.g., relating to workload, performance) of the ECDs and/or global states of the network 1 (e.g., relating to the data traffic, residual bandwidth resources, security status, etc.). Preferably though, the present methods involve monitoring S30, S35 local states of the ECDs 24, so as to best match the needs of each ECD, as assumed in FIGS. 2 and 3. I.e., a trained model 19, 19a, 19b is selected S60, S65 based on states as independently monitored for each ECD 24, so as to be able to timely select the trained model that is best suited for each ECD 24.

One may for example monitor S30, S35 a workload, a power budget and/or a computational budget of some or each of the ECDs 24. The decisions may for instance be based on a current or future (predicted or scheduled) workload, changes in power budget (e.g., low battery level, high/low solar irradiance for solar powered ECDs, etc.), or changes in the computational budget (e.g., device entering/exiting power saving mode). If necessary, different conditions may, however, be monitored for the ECDs (or subsets thereof), e.g., depending on their intended use.

In addition, the present methods preferably involve monitoring S30, S35 figures of merit for respective models 29 as currently used at the ECDs 24. Such figures of merit may be considered as a state of each ECD. Thus, the decision S40, S45 as to whether to change of trained model may be based on a figure of merit as monitored for the model hitherto used by an ECD. Similarly, the trained models 19, 19a, 19b may be selected S60, S65 based on the latest figures of merit observed for each ECDs 24. For example, a decision to change models may be made if a degradation in the local performance of a currently active ML model is observed. Then, searching the available models, a model may be located which outperforms such figures of merit. Any type of objective function may be used to that aim. In fact, as one understands, the decision S40 to change models may likely be based on both an actual condition (workload, power budget, etc.) and the figure of merit as observed for such condition(s).

Figure 2:
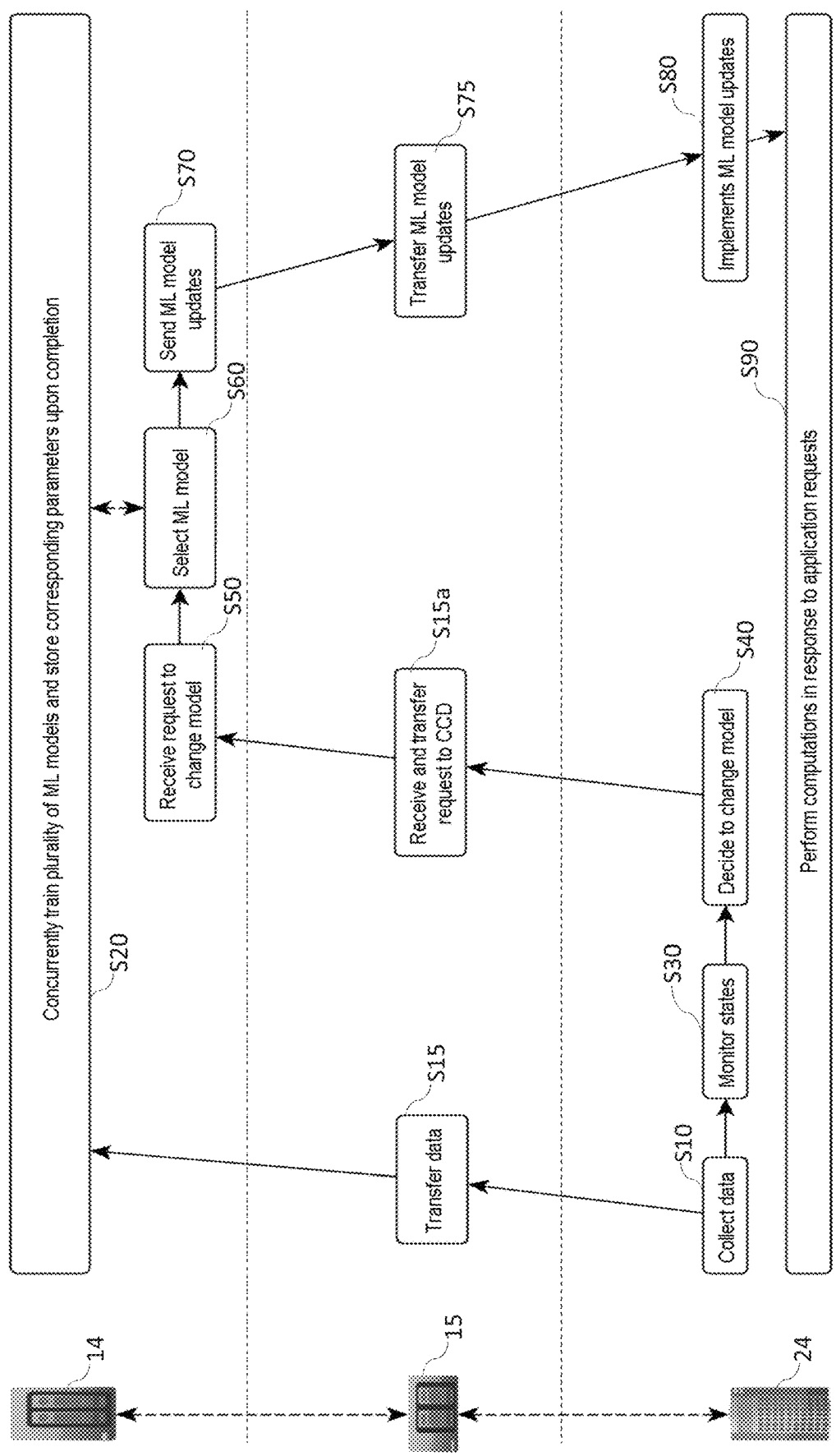
FIG. 2 is a flowchart illustrating high-level steps of a method for optimizing a network such as depicted in FIG. 1, where the model selection is performed at a core computing device, according to embodiments.

In embodiments such as illustrated in FIG. 2, both the monitoring S30 and decision S40 to change models are performed S40 locally at each ECD 24. In this example, all communications between ECDs 24 and CCDs 14 are relayed by intermediate gateways 15. Once a decision is locally made S40 to change of trained model, an ECD 24 sends a corresponding request. Such a request is received S15a at the gateway 15, which transmits S50 it (possibly in another format) to a CCD 14 for it to select S60 a best suited model 19, 19a, 19b as previously trained thereat. Assuming that parameters corresponding to that model have previously been stored on the CCD 14, such parameters can be sent S70 to the gateway, for the latter to transmit S75 to the requesting ECD 24.

More generally, parameters corresponding to each trained model may be stored (upon completion of each training) on the CCD 14 or on the gateway 15, or both. Thus, if the model parameters are stored on the gateway 15, model parameters can be directly provided S75 by the gateway 15, upon request, so as to spare bandwidth, as assumed in FIG. 3. As further assumed in FIG. 3, the steps of monitoring S35 states of the ECDs may be carried out at the level of the gateways. Thus, a gateway may altogether decide S45 when to change the model 29 that is currently active at any of the ECDs it monitors S35. This gateway 15 may further select S65 the most suited models (or parameter set), in view of the monitored states (and, e.g., figures of merits obtained with the hitherto active model).

More generally, steps S35 (S30), S45 (S40) and S65 (S60) may be performed either at a CCD 14 or the gateway 15, depending on where the model data is initially stored S20, S25 and other constraints (architecture, bandwidth resources, etc.).

Figure 3:
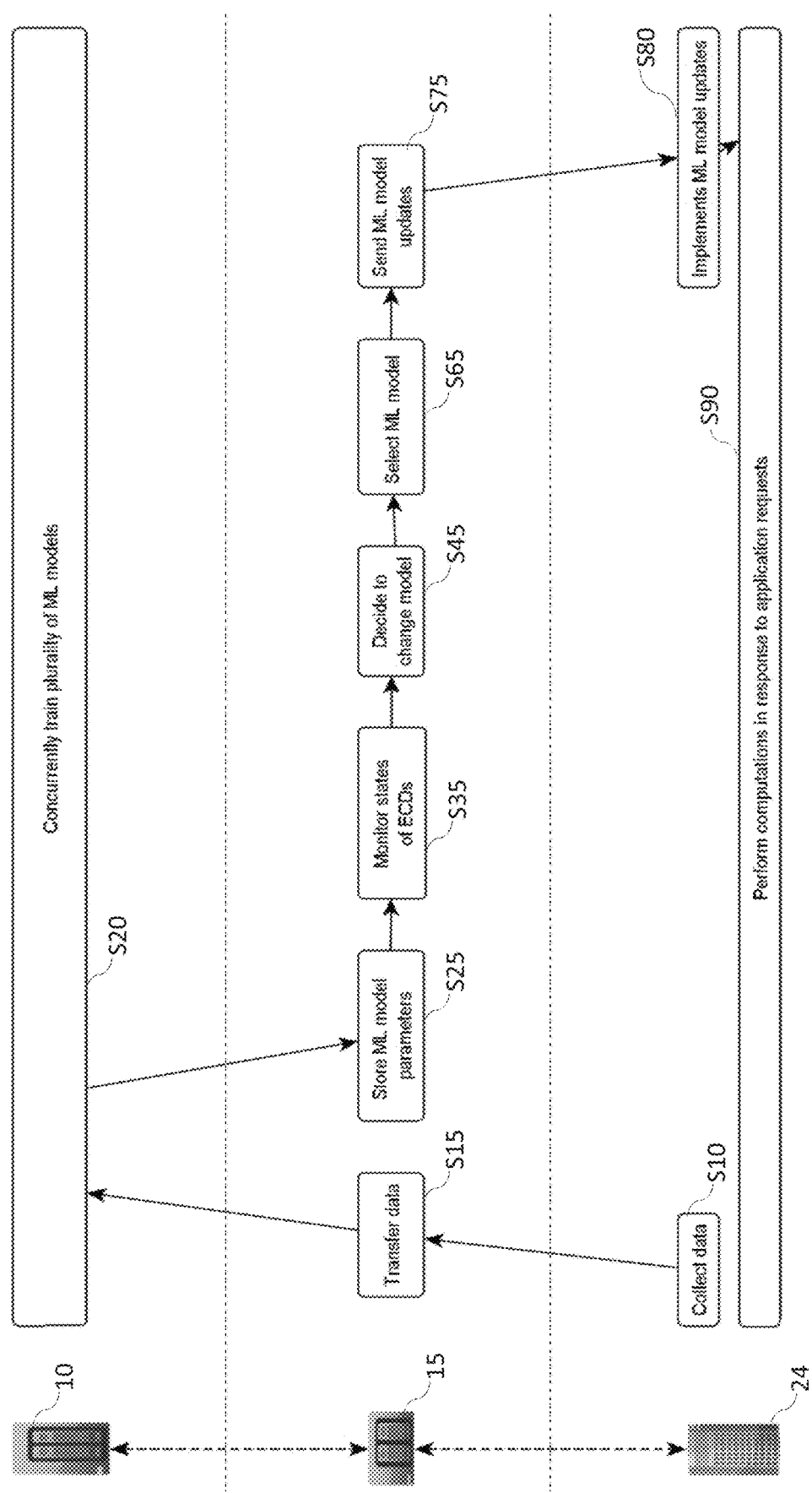
FIG. 3 is a flowchart illustrating high-level steps of a variant to the method of FIG. 2, where parameters of the trained model and stored on a gateway and the model selection is performed at the gateway, according to embodiments.

As one realize, several variants to FIGS. 2 and 3 can be contemplated. For example, ECDs 24 may continuously monitor their power, performance (or other figures of merit) and periodically send their status to a gateway 15 or to a core device 14, for it to decide whether to update S40, S45 the model at any of the ECDs.

As evoked earlier, assuming that ECDs 24 are configured to run several types of trained ML models in batch (one at a time), both a type of ML model and corresponding parameters may be selected at steps S60, S65. Consistently, data pertaining to both the selected type of model and corresponding parameters may be altogether sent S70, S75 to a given ECD 24, for it to resume S90 computations according to the new type of ML model selected and the corresponding parameters.

In other variants, a CCD 14 may periodically send the latest available models to one or more gateways 15. Thus, the gateways 15 could cache the latest trained models. Then, when a request for a new model is generated by the edge devices (or decided by a gateway), the latest trained models could be directly sent from a gateway to an ECD 24, which may be advantageous to reduce the communication latency. Still, the gateways are optional, as noted earlier.

Figure 4:
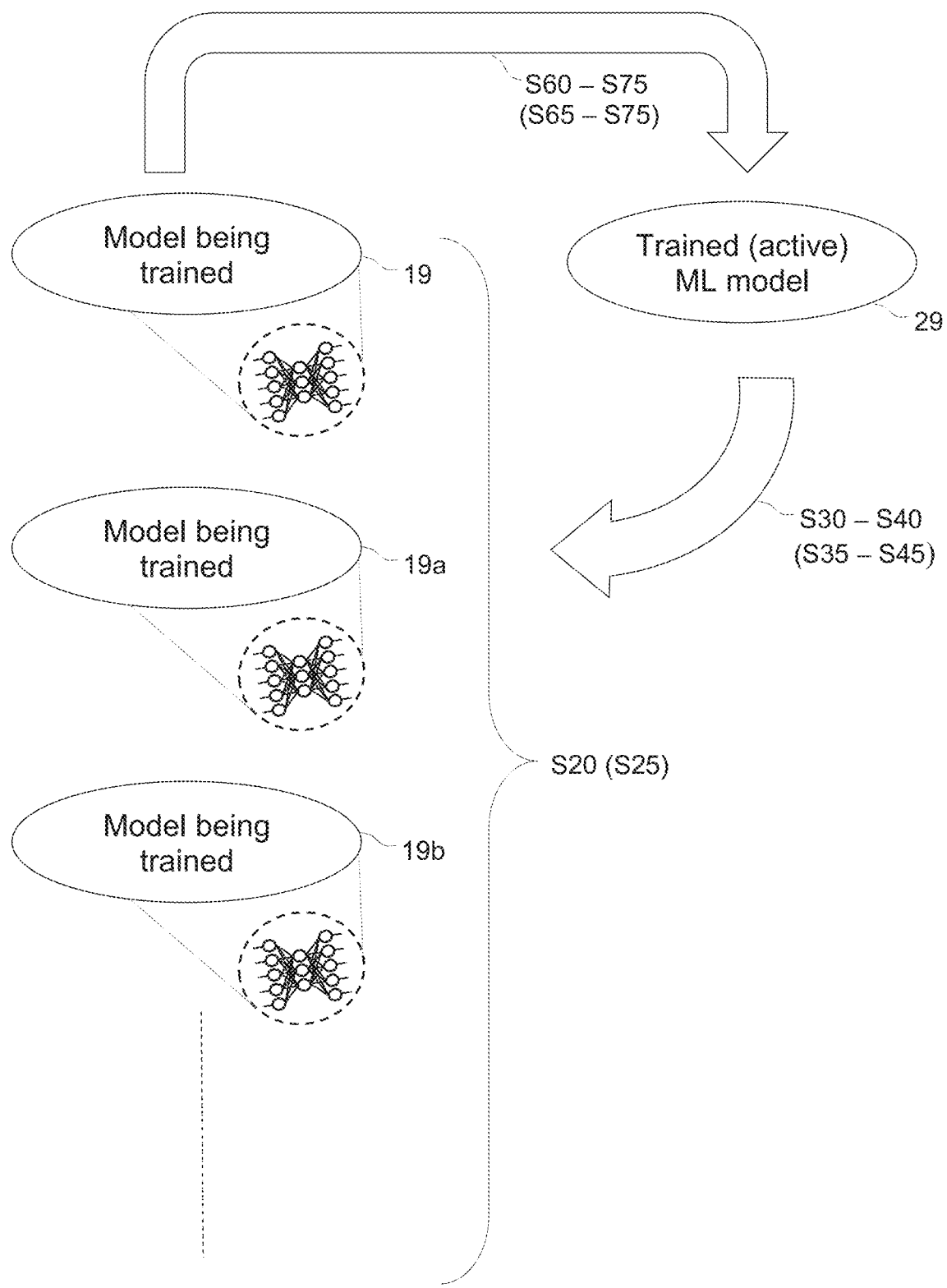
FIG. 4 is a diagram illustrating the substitution of a machine learning model hitherto used by an edge computing device with a model selected from one of the models concurrently trained at the core computing system, as involved in embodiments.

As suggested in FIG. 4, the models 19, 19a, 19b are preferably implemented by neural networks, e.g., large deep convolutional neural networks, as affordable which are feasible to train at the core, given the core's large computational resources. Once trained, each neural network model typically involves respective parameters and different sets of parameters may be involved (where different types of models are used). The neural network may for instance take part or all of the collected S10 data as input (e.g., application data, such as environment-related sensorial data, images, etc.), e.g., in the form of data points. Input data points are then classified by the neural network, to learn the best model parameters for such input data points. The learning is preferably performed in an unsupervised manner, to allow fast reaction to sudden changes in the network. In variants, other cognitive algorithms may be used, such as logistic regression models. Such algorithms are known per se. In all cases, a large set of models can be continually trained at the core devices 14 and then suitably selected S60, S65 to best match current conditions of the network/ECDs. The ECDs can then implement S80 updated model data and resume computations S90 (possibly in a seamless fashion). Thus, methods as proposed herein make it possible to timely implement accurately trained ML models, notwithstanding limited resources of the ECDs.

As said, several types of ML models may be concurrently trained at the core. A same set of ML model types may for instance be continually trained. In variants, however, the types of ML models used may be adaptively set, depending on the context. In all cases, the type of models to be used may for instance depend on applications interacting with the ECD level. For example, if an application predicts a pollution level, then a linear regression could prove to be sufficient in practice. For other types of applications (e.g., image classification), deep neural networks could be preferred.

Various architectures can be contemplated. The example of FIG. 1 assumes that several groups 31, 32 of client devices 30 (which could be mere sensors, notwithstanding the depictions) communicate with ECDs 24 (e.g., wirelessly via routers 25). Distinct groups 31, 32 of clients may interact with respective groups 21, 22 of ECDs, which themselves interact with core devices 14 via gateways 15. The latter may be considered to form part of the core system 10a, though the core computing 10 is essentially ensured by CCDs 14.

Embodiments as described above in reference to FIGS. 2 and 3 illustrate various steps as implemented at the ECDs 24, the gateway 15 and the CCDs 14. In both cases, the gateways are optional (steps they implement may be carried out partly at the ECDs and partly at the CCDs). Relying on gateways is nevertheless preferred inasmuch as this allows different types of network segments (using different communication protocols) to be interfaced and bandwidth consumption to be saved. Yet, the gateways 15 could in fact restrict to mere bridges where similar network segments are involved.

Aspects of the present methods may be implemented at the core computing system 10, 10a (or CCS). Accordingly, another aspect of the invention concerns a method for optimizing a network 1, which is carried out at a CCS 10, 10a. The context otherwise remains the same. That is, the network 1 has an edge computing architecture, i.e., it comprises a set of ECDs 24, locally performing S90 computations based on trained ML models 29. Each ECD is in data communication with the CCS 10, 10a, which may possibly comprises gateways 15.

The method as implemented by the CCS 10, 10a comprises continually training S20 a plurality of ML models 19, 19a, 19b (at the core devices 14), based on data collected S10, S15 from the ECDs 24 (and possibly based on additional expert sources), consistently with principles explained earlier. Meanwhile, upon deciding to change the trained ML model 29 hitherto used by a given ECD 24, the CCS 10, 10a shall select S60 one of the models 19, 19a, 19b it has trained S20 (based on monitored states of the network/ECDs) and send S70 (possibly via a gateway) corresponding model data to the given ECD 24, for the latter to resume S90 computations based on the parameters sent. The monitoring S30, S35 and decisions S40, S45 to change models can possibly be performed at the ECDs, the CCD 14 or a gateway 15, as described earlier.

Conversely, aspects of the present methods may be implemented at the ECDs. Accordingly, another aspect of the invention concerns a method for optimizing a network 1, which is carried out at an ECD 24, the context being otherwise the same. Each ECD 24 is here assumed to monitor S30 its own states (conditions, figures of merit, etc.), while ML models are otherwise continually trained S20 at the CCS 10, 10a. After a decision is made S40, S45 (either at the ECD or a gateway) to change of trained model 29, this ECD receives S75 model data corresponding to a selection made at the gateway or at the CCD, consistently with principles explained earlier. This ECD can then resume S90 computations based on the model data received. Again, after each new training S20, model data can be stored either on the CCD 14 or the gateway 15. Decisions to change models can possibly be performed at an ECD, the CCD 14 or the gateway 15. And here again, computations S90 may possibly be performed in response to requests from applications 30 and the currently active models 29 may be configured as inference engines, so as for the ECDs to perform S90 said computations, as discussed earlier.

Referring back to FIG. 1, another aspect of the invention is now described, which concerns the network 1 itself. Essential features of this network 1 have already been discussed in reference to the present methods; they are only briefly reminded in the following. The network 1 comprises a CCS 10, 10a and a set of ECDs 24, having an edge architecture. Each of the ECDs 24 is configured to locally perform S90 computations based on a currently active ML model 29. The CCS 10, 10a is configured to continually train a plurality of ML models 19, 19a, 19b, based on data it collects from the ECDs 24 and, optionally, from additional expert sources, in operation. The network 1 is otherwise configured to monitor states of the network 1 and/or components 14, 15, 24, 25 thereof, and decide, based on the monitored states, whether to change the trained ML model 29 hitherto used by any ECD 24 to perform S90 said computations. In addition, the network 1 is adapted to select (again based on the monitored states) one of the models 19, 19a, 19b trained S20 so far at the CCS 10, 10a and send corresponding parameters to said given ECD 24, for it to resume S90 computations. As said earlier, the network 1 may otherwise involve gateways or bridges mediating communications between ECDs and CCDs, as well as other common network components. Additional features of this network are described in section 2.2.

Next, according to a final aspect, the invention can be embodied as a computer program product for optimizing a network as described above. This computer program product comprises a computer readable storage medium having program instructions embodied therewith, wherein the program instructions are executable by one or more processors, to cause to take steps according to the present methods. Additional features of this computer program product are described in section 2.3.

In some aspects, a method of the present disclosure may relate to optimizing a network, such as a cloud computing network. The network has an edge computing architecture. I.e., it comprises a core computing system, or CCS, and a set of edge computing devices, or ECDs, wherein each of the ECDs locally performs computations based on a trained machine learning model (hereafter ML model) and is in data communication with the CCS. According to the method, a plurality of ML models are continually trained at the CCS, concurrently, based on data collected from the ECDs. While the models are being trained at the CCS, one or more states of the network and/or components thereof are monitored. The monitored states are relied upon to decide (when) to change a trained ML model as currently used by any of the ECDs to perform said computations. It may accordingly be decided to change the model hitherto used by a given one of the ECDs to perform ML-based computations, based on the monitored states of the network. Then, one of the models as trained at the CCS is selected (based on the monitored states) and corresponding parameters are sent to this ECD. The latter can thus resume computations according to a trained model, which model is based on the parameters sent to it. Related methods, networks and computer program products are further presented.

In some aspects, a method may be provided for optimizing a network having an edge computing architecture, the network comprising a core computing system, or CCS, and a set of edge computing devices, or ECDs, wherein each of the ECDs locally performs computations based on a trained machine learning model and is in data communication with the CCS. The method may comprise, at the CCS: continually training a plurality of machine learning models, based on data collected from the ECDs; and while continually training the models and upon deciding, based on monitored states of the network and/or components thereof, to change the trained machine learning model hitherto used by a given one of the ECDs to perform said computations, selecting, based on the monitored states, one of the models trained at the CCS and sending corresponding parameters to said given one of the ECDs, for the latter to resume computations according to a trained machine learning model based on the parameters sent.

In some aspects, a method may be provided for optimizing a network having an edge computing architecture, wherein the network comprises: a set of edge computing devices, or ECDs, wherein each ECD of the set locally performs computations based on a trained machine learning model; and a core computing system, or CCS, in data communication with said each ECD, wherein the CCS continually trains a plurality of machine learning models, based on data collected from the ECDs, wherein the method comprises, at said each ECD, and while continually training the models at the CCS: monitoring one or more states of said each ECD; upon deciding, based on the monitored states, to change the trained machine learning model hitherto used by said each ECD to perform said computations, receiving parameters corresponding to a selected one of the models trained at the CCS, based on the monitored states, for said each ECD to resume computations based on the parameters received. The method may also further comprise, at said each ECD: continually performing said computations, in response to requests from applications in data communication with said each ECD, thanks to a currently active model, the active model configured as an interference engine to perform said computations.

2. Specific Embodiments—Technical Implementation Details

2.1 Clouds

This document refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

2.1 Network and Computerized Units Thereof

Computerized devices can be suitably designed for implementing embodiments of the present invention as described herein. In that respect, it can be appreciated that the methods described herein are essentially non-interactive and automated. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein digital computers 14, 15, 24, 30, such as high-performance computers, workstations, routers, etc., or other computerized devices (e.g., sensors) are used.

The computerized devices 14, 24, 25 involved in a network 1 such as described in sect. 1 may typically involve, each, in terms of hardware architecture, a processor, a memory coupled to a memory controller, and one or more input and/or output (I/O) devices (or peripherals) that are communicatively coupled via a local input/output controller. The input/output controller can be, but is not limited to, one or more buses or other wired or wireless connections, as known in the art. The input/output controller may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The network 1 may possibly include sensors (notably as part of the client devices 30) attached to the ECDs 24, i.e., hardware devices that produce a measurable response to a change in a physical condition like temperature or pressure. Typically, the analog signal produced by the sensors is digitized by an analog-to-digital converter and sent to controllers for further processing. Sensor nodes are ideally small, consume low energy, are autonomous and operate unattended.

The network 1 transmits and receives data between its components 14, 15, 24, 25, 30. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network 1 can also be an IP-based network for communication between the unit and any external server, client and the like via a broadband connection. In exemplary embodiments, network can be a managed IP network administered by a service provider. Besides, the network can be a packet-switched network such as a LAN, WAN, Internet network, etc.

2.3 Computer Program Products

The present invention may be a network, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, the computation and power constraints of the edge devices 24 can be taken into consideration in the deployment of a cross-validation technique. That is, the present methods assume that all training is performed in the core, and not on the edge devices. As a result, all necessary cross-validation of the ML models can be made in the core, whereas model parameter communications can be performed as a reaction to real-time constraints of the edge devices (the latter only using the ML models for inference purposes), for example.

What is claimed is:

1. A method for optimizing a network having an edge computing architecture, the network comprising a core computing system, or CCS, and a set of edge computing devices, or ECDs, wherein each of the ECDs locally performs computations based on a trained machine learning model and is in data communication with the CCS, the method comprising:
    continually training, at the CCS, a plurality of machine learning models, concurrently, based on data collected from the ECDs; and
    while training the models:
        monitoring via at least one state machine one or more states of the network and/or components thereof, said one or more states including at least security status;
        deciding, based on the monitored states, to change the trained machine learning model hitherto used by a given one of the ECDs to perform said computations; and
        selecting, based on the monitored states, one of the models trained at the CCS and sending corresponding parameters to said given one of the ECDs, for the latter to resume computations according to a trained machine learning model based on the parameters sent,
    wherein running of said at least one state machine triggers the trained machine learning model change,
    wherein the concurrently trained machine learning models are timely made available for use at the given one of the ECDs.

2. The method according to claim 1, wherein monitoring said states comprises monitoring states of the ECDs and/or a network state of the network.

3. The method according to claim 2, wherein monitoring said states comprises monitoring states of the ECDs, and wherein said one of the trained models is selected based on one or more monitored states of said given one of the ECDs.

4. The method according to claim 3, wherein deciding to change the trained machine learning model is performed locally at said given one of the ECDs.

5. The method according to claim 4, wherein the CCS comprises a core computation device, or CCD, and a gateway, the latter in data communication with, on the one hand, the CCD and, on the other hand, at least a subset of the ECDs, said subset including said given one of the ECDs.

6. The method according to claim 5, wherein the method further comprises, after deciding to change the trained model:
    receiving, at the gateway, a request to change of trained machine learning model from said given one of the ECDs; and
    after having selected said one of the models trained at the CCS, sending, from the gateway, said corresponding parameters to said given one of the ECDs.

7. The method according to claim 6, wherein the method further comprises, upon receiving the request and prior to sending said corresponding parameters from the gateway:
    transferring to the CCD a request corresponding to the request as received at the gateway, for the CCD to select said one of the models and send corresponding parameters to the gateway.

8. The method according to claim 3, wherein
monitoring said states comprises monitoring figures of merit for respective models as currently used at the ECDs, and
deciding to change the trained machine learning model hitherto used by said given one of the ECDs is based on a figure of merit as monitored for the model hitherto used by said given one of the ECDs.

9. The method according to claim 3, wherein
monitoring said states comprises monitoring states as to one or more of:
a workload of one or each of the ECDs;
a power budget of one or each of the ECDs; and
a computational budget of one or each of the ECDs.

10. The method according to claim 1, wherein
the CCS comprises a core computation device, or CCD, and a gateway, the latter in data communication with, on the one hand, the CCD and, on the other hand, at least a subset of the ECDs, said subset including said given one of the ECDs, and
the steps of monitoring said states, deciding to change the trained model and selecting said one of the models are each performed at said one of the CCD and the gateway.

11. The method according to claim 10, wherein the method further comprises:
storing parameters of the trained models, upon completion of the training of each of the trained models, on said one of the CCD and the gateway,
and wherein
the parameters of the selected model are sent to said given one of the ECDs from said one of the CCD and the gateway.

12. The method according to claim 11, wherein
the steps of monitoring, deciding to change the trained model, selecting said one of the models and sending corresponding parameters are each performed at the gateway.

13. The method according to claim 1, wherein
each of said ECDs is configured to potentially run several types of trained machine learning models, one at a time, as an inference engine.

14. The method according to claim 13, wherein
selecting comprises selecting, based on the monitored states, both a type of model and parameters thereof, and wherein
the method further comprises sending data pertaining to the selected type of model, in addition to sending parameters thereof, to said given one of the ECDs, for the latter to resume computations according to a trained machine learning model based on the data and parameters sent.

15. A network having an edge computing architecture, wherein the network comprises:
a core computing system, or CCS, and
a set of edge computing devices, or ECDs, wherein each of the ECDs is configured to locally perform computations based on a trained machine learning model and is in data communication with the CCS,
wherein
the CCS is configured to continually train a plurality of machine learning models, based on data it collects from the ECDs, in operation,
and wherein
the network is configured to:
monitor via at least one state machine one or more states of the network and/or components thereof, said one or more states including at least security status;
decide, based on the monitored states, whether to change the trained machine learning model hitherto used by a given one of the ECDs to perform said computations; and
select, based on the monitored states, one of the models trained at the CCS and send corresponding parameters to said given one of the ECDs, for the latter to resume computations according to a trained machine learning model based on the parameters sent, in operation,
wherein running of said at least one state machine triggers the trained machine learning model change,
wherein the concurrently trained machine learning models are timely made available for use at the given one of the ECDs.

16. A computer program product for optimizing a network having an edge computing architecture, wherein the network comprises a core computing system, or CCS, and a set of edge computing devices, or ECDs, wherein each of the ECDs locally performs computations based on a trained machine learning model and is in data communication with the CCS, the computer program product comprising a computer readable storage medium having program instructions embodied therewith, the program instructions executable by one or more processors of the network, to cause to:
continually train, at the CCS, a plurality of machine learning models, based on data collected from the ECDs; and
while training the models:
monitor via at least one state machine one or more states of the network and/or components thereof, said one or more states including at least security status;
decide, based on the monitored states, to change the trained machine learning model hitherto used by a given one of the ECDs to perform said computations; and
select, based on the monitored states, one of the models trained at the CCS and send corresponding parameters to said given one of the ECDs, for the latter to resume computations according to a trained machine learning model based on the parameters sent,
wherein running of said at least one state machine triggers the trained machine learning model change,
wherein the concurrently trained machine learning models are timely made available for use at the given one of the ECDs.

* * * * *